United States Patent

[11] 3,550,633

| [72] | Inventor | Robert J. Fife |
| | | Downers Grove, Ill. |
| [21] | Appl. No. | 823,423 |
| [22] | Filed | May 9, 1969 |
| [45] | Patented | Dec. 29, 1970 |
| [73] | Assignee | Crane Co. |
| | | Chicago, Ill. |
| | | a corporation of Illinois |

[54] MIXING VALVE
18 Claims, 19 Drawing Figs.

[52] U.S. Cl.................................................. 137/636.4,
137/454.6, 137/607
[51] Int. Cl.................................................. F16k 11/14
[50] Field of Search......................................... 137/636-
—636.4, 637.4, 609, 454.6, 607

[56] References Cited
UNITED STATES PATENTS

| 874,737 | 12/1907 | Bucklin | 137/636.1 |
| 2,061,814 | 11/1936 | Stout | 137/636.1X |
| 2,205,684 | 6/1940 | Cochran | 137/636.2 |
| 2,301,439 | 11/1942 | Moen | 137/636.1 |
| 2,980,130 | 4/1961 | Harke | 137/636.4X |
| 3,155,115 | 11/1964 | Zeigler | 137/636.4 |
| 3,211,420 | 10/1965 | Hartmann | 251/309 |
| 3,329,171 | 7/1967 | Sibbald | 137/636.1 |
| 3,358,715 | 12/1967 | Garvin | 137/636.4 |
| 3,421,540 | 1/1969 | Fulton | 137/636.4X |

Primary Examiner—Clarence R. Gordon
Attorney—George S. Schwind

ABSTRACT: A liquid mixing valve of the single handle type for mixing hot and cold water which incorporates a unitary valve cartridge having poppet valves carried by the cartridge. The valve cartridge and poppet valves are readily removable as a unit for replacement purposes.

3,550,633

1

MIXING VALVE

BACKGROUND AND SUMMARY OF THE INVENTION

The basic objective of the invention is to provide a single handle mixing valve which will embody a removable and readily replaceable valve cartridge, the said valve cartridge carrying the closure members generally termed the poppet valves for both the hot and cold water.

Another objective of the invention is to provide valve structures of the character described which will have an actuating cam member that is reciprocable and also rotatable and wherein the cam member is adapted to actuate a pair of poppet valves which are carried by and unitary with a removable and readily replaceable valve cartridge.

Another object of the invention resides in the provision of a mixing valve having a single operating handle for actuating poppet valves which are carried by a unitary valve cartridge and wherein reciprocation of the handle will control the volume of the liquid dispensed by the valve whereas rotation of the handle will control the temperature of the dispensed liquid.

A more specific object of the invention is to provide a unitary valve cartridge for a liquid mixing valve which will carry the poppet valves for the hot and cold liquid and also the resilient spring means for retaining the poppet valves in closed position and wherein the valve cartridge as a unit can be easily removed from the valve housing for repair or replacement.

Another object of the invention resides in the provision of a unitary valve cartridge of plastic or other suitable material and of generally cylindrical shape and wherein a pair of poppet valves are carried by the cartridge on respective sides so that upon insertion of the cartridge within the valve housing the actuating cam will be automatically located within the cartridge in operative associated relation with both poppet valves.

EXEMPLARY EMBODIMENTS

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts:

2

Figure 13:
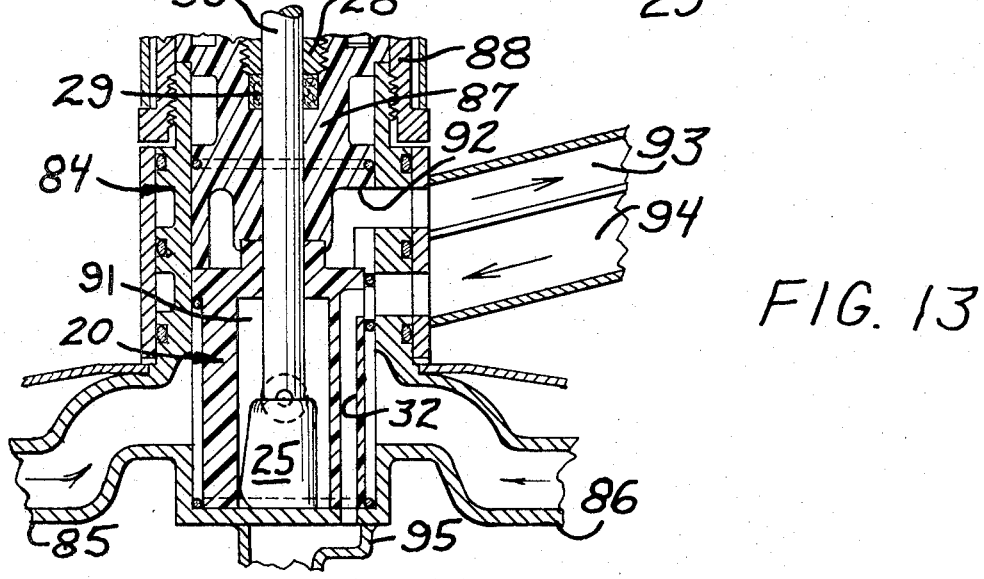
Figure 15:
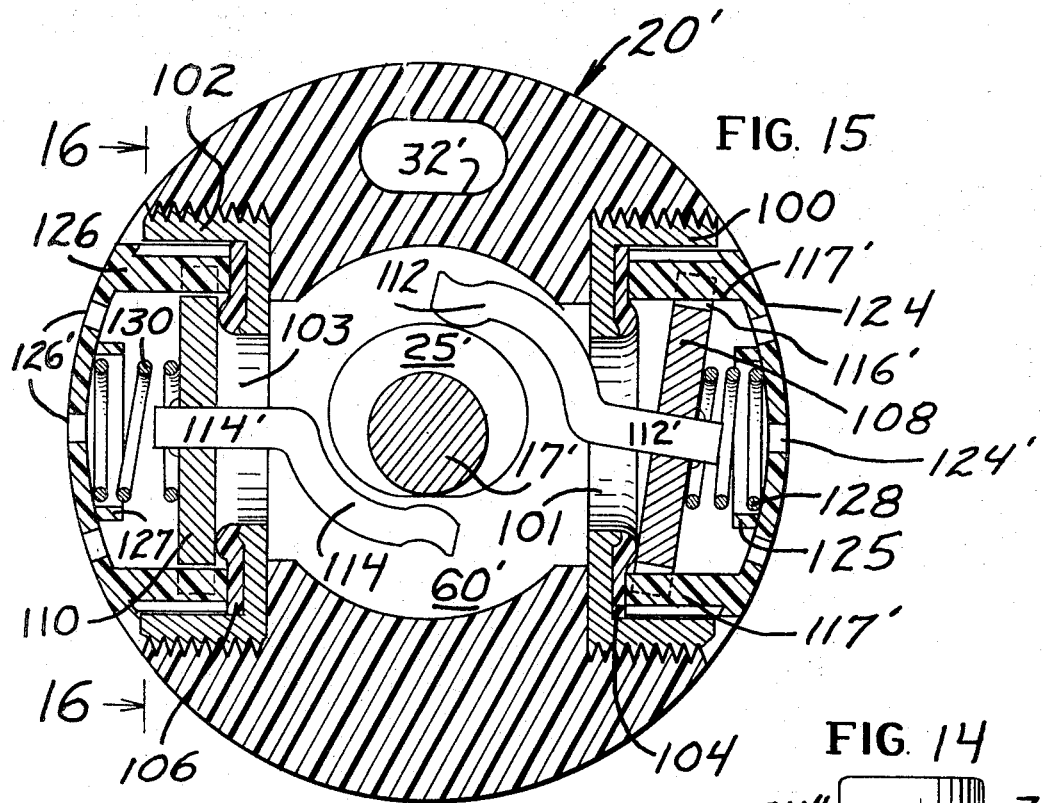
Figure 16:
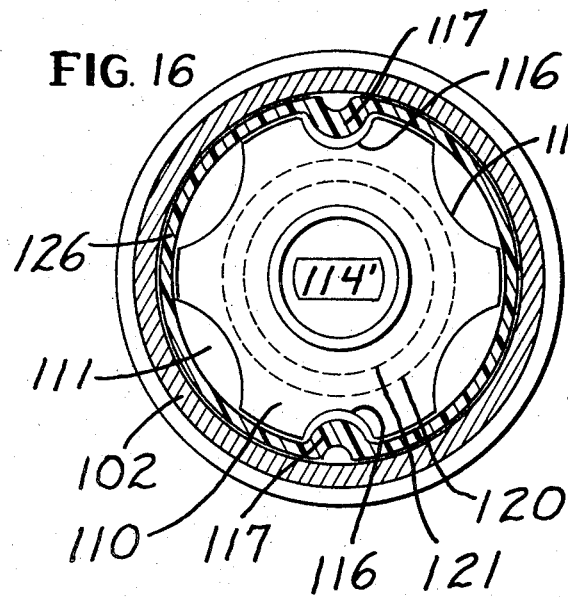
Figure 14:
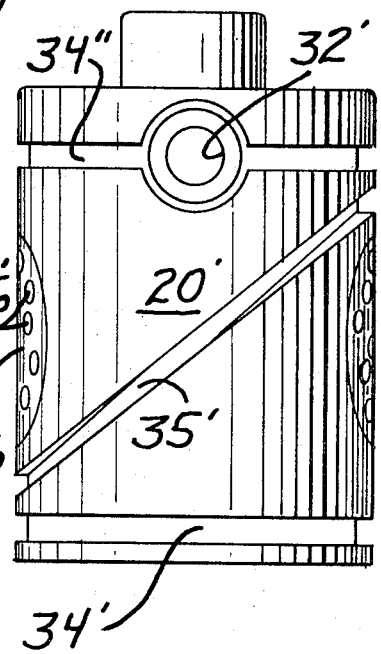
Figure 17:
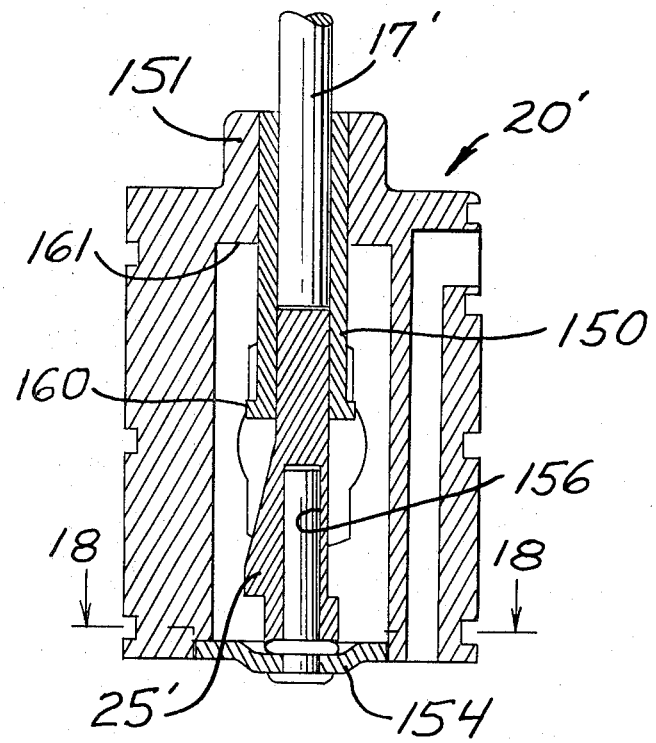
Figure 19:
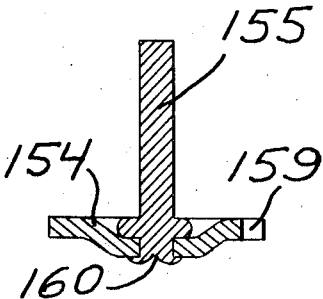
Figure 18:
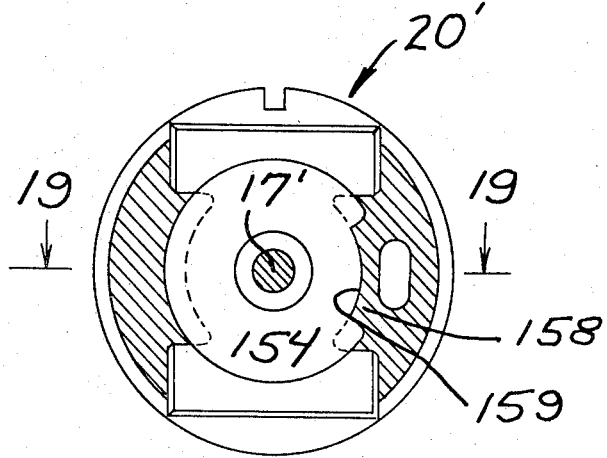

FIG. 13 is a fragmentary sectional view showing the unitary valve cartridge of the invention as embodied in valve structure for a tub and shower combination;

FIG. 14 is an elevational view of a modified form of the removable and replaceable unitary valve cartridge;

FIG. 15 is a transverse sectional view of the cartridge of FIG. 14 taken substantially through the poppet valves;

FIG. 16 is a sectional view of the poppet valve assembly taken substantially on line 16-16 of FIG. 15;

FIG. 17 is a longitudinal sectional view of the cartridge of FIG. 14 taken substantially on line 17-17, with the poppet valve removed for purpose of clarity, showing a modified stem and stem guide arrangement;

FIG. 18 is a transverse sectional view of the cartridge taken substantially on line 18-18 of FIG. 17; and, FIG. 19 is a longitudinal sectional view showing only the stem guide means taken along lines 19-19 of FIG. 18.

Figure 1:
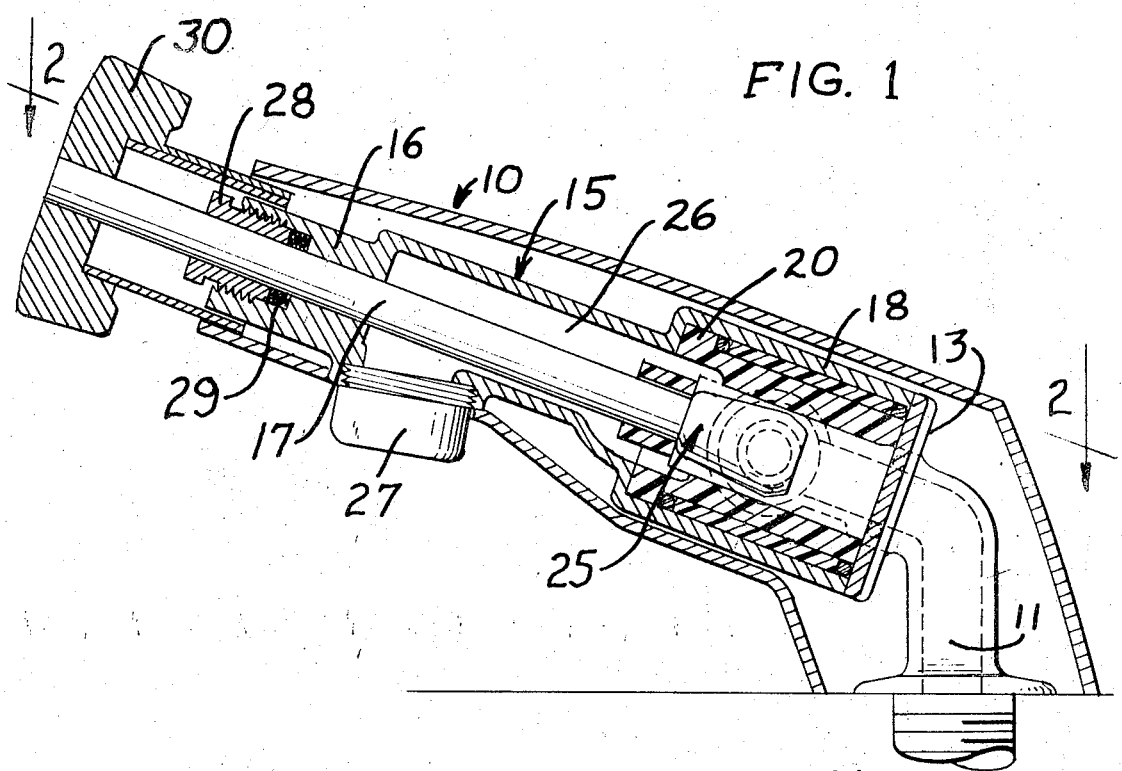
FIG. 1 is a sectional view taken longitudinally through valve structure constructed in accordance with the embodying the improvements of the invention.
Figure 2:
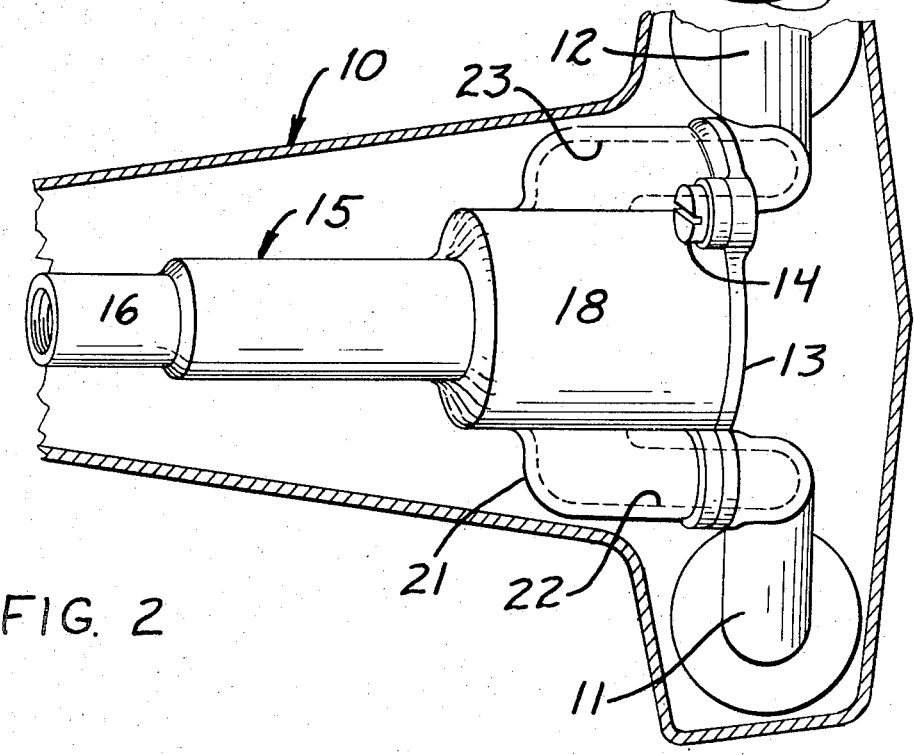
FIG. 2 is a sectional view taken substantially on line 2-2 of FIG. 1.
Figure 3:
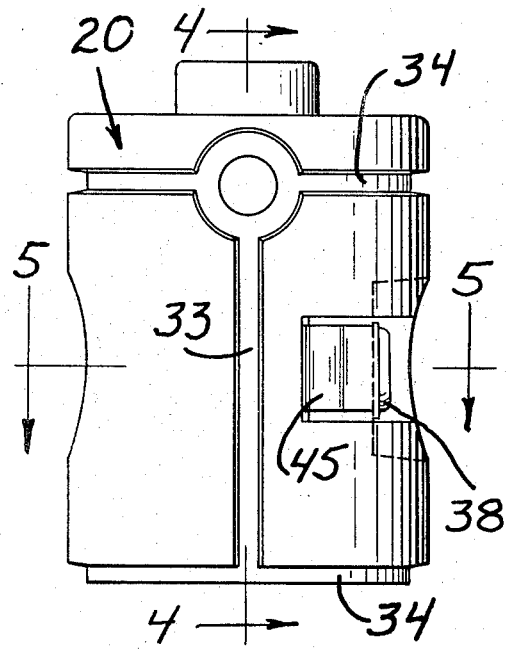
FIG. 3 is an elevational view of the removable and replaceable unitary valve cartridge of the invention.

In FIGS. 1 and 2, the valve structure disclosed has been particularly designed as equipment for a sink or the like and wherein the valve housing 10 of special shape is adapted to be releasably secured in place on a top wall portion of the sink and in enclosing relation with the hot and cold water supply pipes 11 and 12 respectively. The pipes are preferably integral with a rear plate 13 which is conveniently secured by the screws 14 to the mixing housing 15 of the valve. The mixing housing includes a top entrance portion 16 for the stem 17 and a bottom cylindrical portion 18 for accommodating the unitary valve cartridge 20. The portion 18 of the mixing housing provides the side extensions 21 which in turn provide the interior passages or ducts 22 and 23 for the hot and cold water and which are joined by the rear plate 13 to the hot and cold water supply pipes 11 and 12, respectively.

The ducts 22 and 23 deliver the hot and cold water to respective sides of the valve cartridge 20 having location within the part 18 of the mixing housing and in operative associated relation with an operating cam 25 fixed to the end of the actuating stem 17. It will be observed that the mixing housing in combination with the valve cartridge provides a mixing chamber 26 which delivers the mixed liquid through the spout 27. The stem 17 extends through the portion 16 of the mixing housing and has associated therewith the packing nut 28 and the packing 29. The extending end of the actuating stem is suitably fixed to the knob 30. The stem 17 and thus the operating cam 25 are adapted to be actuated in a push-pull manner and also to be rotated for actuating the poppet valves carried by the cartridge 20 all in a manner which will now be described.

Figure 4:
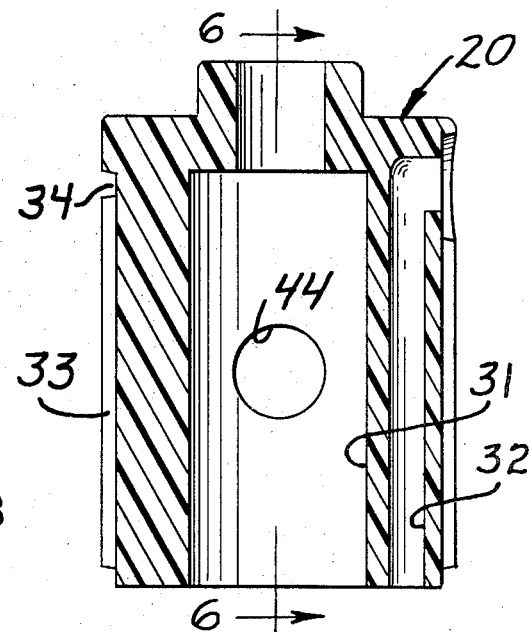
FIG. 4 is a longitudinal sectional view of the cartridge of FIG. 3 taken substantially on line 4-4.
Figure 5:
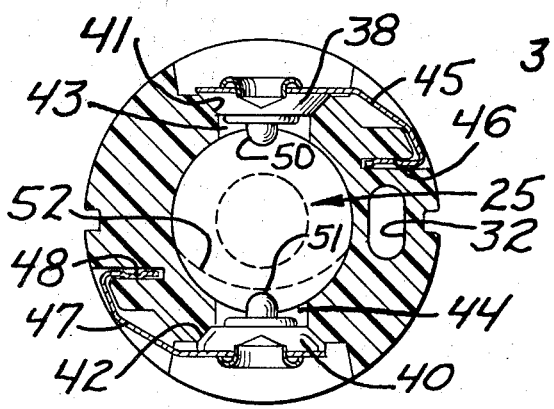
FIG. 5 is a transverse sectional view of the cartridge of FIG. 3 taken substantially on line 5-5 of said FIG.

The valve cartridge 20, FIGS. 4 and 5, is formed of plastic or other suitable material and the same is cylindrical having a central passage 31 extending longitudinally of the cartridge. The lower end of the said valve cartridge is open whereas the top end is partly open for accommodating the stem 17. Also the cartridge is provided with the diverter channel or passage 32 and the exterior of the cartridge is formed with the longitudinal and circumferential grooves 33 and 34 for receiving the harness shown in FIG. 7. The harness seals the respective sides of the cartridge to thus seal the hot water side from the cold water side. Accordingly, the harness includes the longitudinal members 35 and the circular members 36. The ring 37 has utility in respect to a tub and shower combination as will be presently described.

In accordance with the invention the valve cartridge carries a pair of closure members or poppet valves 38 and 40 which seat on the valve seats 41 and 42 provided by the openings 43 and 44, respectively. The poppet valve 38 for controlling the hot water is fixed to extending end of a leaf spring 45 having a bent end which is anchored at 46. The leaf spring is so tensioned as to maintain the poppet valve 38 in closed relation on its valve seat 41. In a similar manner the poppet valve 40 for the cold water is carried by a leaf spring 47 and which has it bent end anchored at 48. The side leaf spring 47 functions to maintain the valve 40 in closed position against its seat 42.

Figure 8:
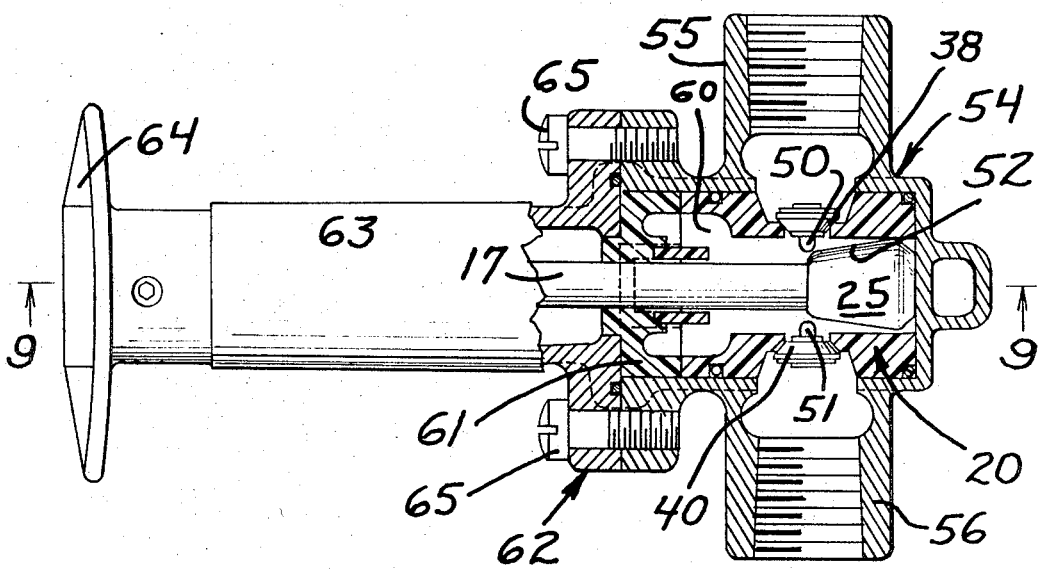
FIG. 8 is a fragmentary sectional view showing a modified form of valve structure embodying the improvements of the invention.

The poppet valves 38 and 40 are actuated into an open position by the cam member 25 which as described reciprocable and also rotatably. For this purpose each poppet valve has a button of characteristic formation extending inwardly into the mixing chamber for contact by the cam 25 when the cam is actuated. The button 50 is integral with the poppet valve 38 and the button 51 is integral with the poppet valve 40. The cam member 25 has a truncated exterior shape with one side 52 made approximately flat as best shown in FIGS. 5 and 8 and which flat side faces the button 50 for the hot water poppet valve 38. It will be thus understood that the opposite surface of the cam member 25 faces the button 51 on the cold water poppet valve 40 since the valves are disposed in the cartridge approximately 100 and 80° apart.

The valve structure of FIGS. 1 and 2 has been designed for a sink or the like and the mode of operation is believed obvious from the foregoing description. When the knob 30 is pulled out the cam 25 is caused to contact the button 51, FIG. 5, and the poppet valve 40 will be opened to admit cold water to the mixing chamber 26 and which is discharged from the spout 27. The cam 25 is generally cone shaped having its maximum diameter at its base end. Thus the maximum amount of water is obtained when the stem is pulled out to its full extent as shown in FIG. 1. Due to the flat surface 52 on the cam 25 the button 50 is actuated only when the cam is rotated and accordingly by rotating the cam both hot and cold water will be admitted to the mixing chamber. Here also the volume of the hot water as well as that of the cold water is controlled by the extent of outward movement of the stem 17. The water is shut off by pushing the stem in and turning the stem so that the flat surface 52 is again positioned opposite the button 50.

Figure 9:
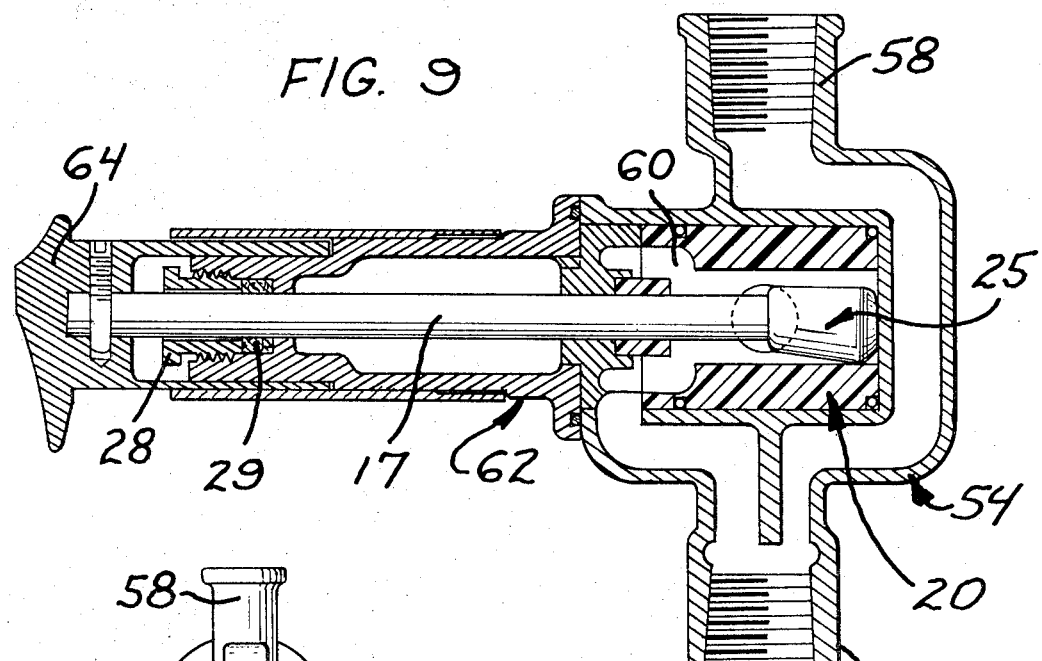
FIG. 9 is a longitudinal sectional view taken substantially along line 9-9 of FIG. 8.
Figure 10:
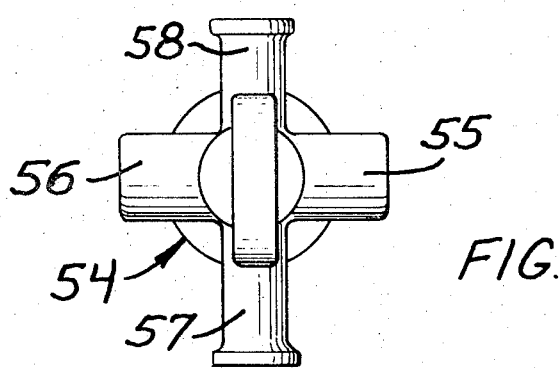
FIG. 10 is a rear elevational view of the valve structure of FIGS. 8 and 9 on a smaller scale.

The valve structure of FIGS. 8 and 9 is basically similar to that of FIGS. 1 and 2. However, one distinction exists in that the valve cartridge 20 is removable from the front instead of from the rear as in FIGS. 1 and 2. The valve housing 54 of FIGS. 8 and 9 is approximately a cross as regards its rear end so that the extensions 55 and 56 form the inlet connections for the hot and cold water whereas the extensions 57 and 58 provide the outlet connections from the mixing chamber 60 and which may deliver to a tub and to a shower for example. The valve cartridge 20 is retained in place by the spacer 61 and by the cap plate 62 having the tubular extension 63 integral therewith. The stem 17 extends through the spacer and extension to project beyond and receive the knob 64. The cap plate 62 is releasably secured to the valve housing 54 by the screws 65 and thus the cap plate can be easily removed for convenient removal of the unitary valve cartridge 20.

The operation of the valve as shown in FIGS. 8 and 9 is the same as described since upon pulling out of the knob 64 the cam 25 will be caused to contact the button 51 and open the cold water poppet valve 40. Since the flat surface 52 is adjacent the button 50 this movement of the cam 25 does not open the hot water poppet valve 38. However, with the cold water flowing through the mixing chamber, hot water can be added by merely turning the stem 17 and thus the cam 25 to actuate the poppet valve 38 into an open position.

In both embodiments thus far described, the valve cartridge can be easily removed as a unit for repair or for replacement of a new unit. When the valve cartridge is inserted the same automatically associates itself with the cam 25 which enters the central passage 31 of the cartridge and is thereby properly positioned with respect to the hot and cold water poppet valves. This inserting and positioning of the valve cartridge 20 is facilitated by the harness shown in FIG. 7. In assembled relation, the circular members 36 of the harness interfit with the grooves 34 and the longitudinal members 35 interfit the the grooves 33. The ring 37 is associated with the opening leading to the diverter channel 32. The harness provides the necessary O-rings in order to separate and seal the respective sides of the valve cartridge one of which is associated with the hot water and the other with the cold water.

Figure 12:
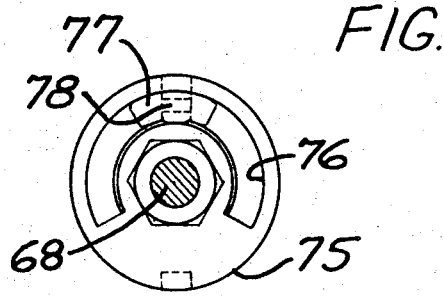
FIG. 12 is a transverse sectional view taken substantially on line 12-12 of FIG. 11 and showing the shoe and the track for the shoe which is formed in the spacer member.
Figure 11:
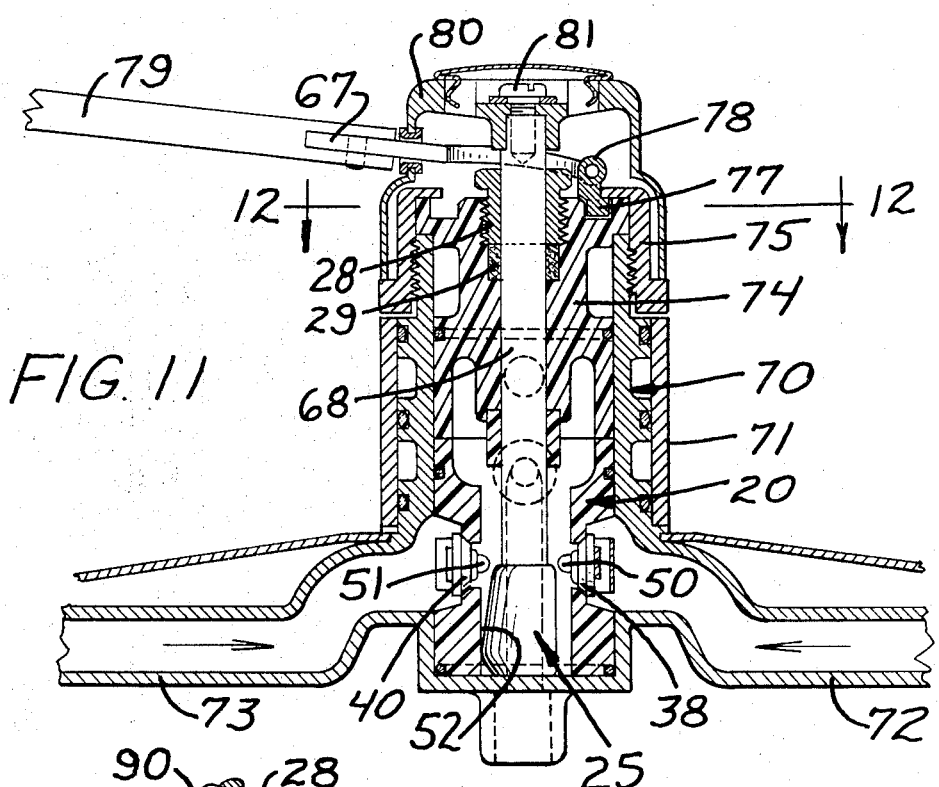
FIG. 11 is a longitudinal sectional view of another modified form of valve structure which also embodies the improvements of the invention.

In FIGS. 11 and 12 a further modification of the invention is shown and which is characterized by a single pivoted lever 67 for actuating the valve stem 68 both for push-pull movement and for rotation. This modification is usually utilized in a kitchen sink installation. The mixing housing 70 for the valve is enclosed within an outer cover 71 and said housing is integral with a hot water duct 72 and a cold water duct 73. The valve cartridge 20 is retained by the mixing housing with the hot and cold water poppet valves in proper associated relation with the ducts 72 and 73. The said retaining means includes the spacer 74 and the cap member 75 which is threaded to the mixing housing. The spacer 74 retains the packing 29 and the packing nut 28. The spacer also has a groove 76 formed in its top surface and which is circular, extending for approximately 270°. The shoe 77 is adapted to ride in the groove and said shoe provides the hinge 78 and the bifurcated ends of the lever 67 is thus pivoted at 78 to the shoe. The handle 79 is secured to the extending end of the lever 67 and the operator can therefore actuate the handle to cause push and pull movement of the stem 68 and also rotation of the stem.

The pivot structure as shown in FIG. 11 is completed by the enclosing cap 80 which encircles and rests on the upper portion of the cap member 75. The enclosing cap is secured at 81 to the stem 68 and the enclosing cap has an opening for the lever 67. For removal of the valve cartridge 20 from the valve structure, it is only necessary to unscrew the cap member 75. The spacer can then be lifted from the mixing housing and this permits convenient removal of the valve cartridge.

The valve structure shown in FIG. 13 has been designed for a tub and shower combination where a diverter valve is employed. In its basic features the valve is similar to that shown in FIGS. 11 and 12 since the mixing housing 84 is provided with the hot and cold water ducts 85 and 86 respectively and said housing is adapted to receive the valve cartridge 20. The cartridge is retained in place by the spacer 87 and by the cap member 88. The spacer retains the packing nut 28 and the packing 29 for the longitudinally extending valve stem 90. In this form of valve the mixing chamber 91 is connected by the passage 92 which delivers to the pipe 93 for the tub. When water for the shower is desired, the operator actuates a diverter valve, not shown, which diverts the liquid from pipe 93 to pipe 94. From said pipe the mixed liquid is caused to flow through the diverter channel 32 of the valve cartridge and into the shower delivery pipe 95.

Figure 6:
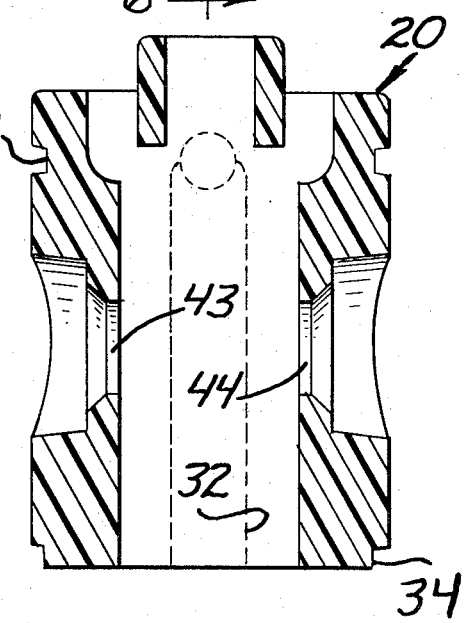
FIG. 6 is a longitudinal sectional view taken substantially on line 6-6 of FIG. 4.
Figure 7:
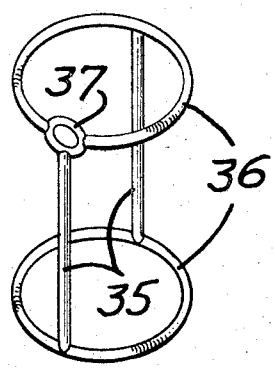
FIG. 7 is a perspective view of the harness for interfitting relation with the valve cartridge.

A modified form of cartridge and poppet valve structure is shown in FIGS. 14—16 wherein cartridge 20' is similar in construction to the basic cartridge 20 shown in FIGS. 4 and 6. The unitary harness, as shown in FIG. 7, is replaced by three separate O-rings which accomplish the same purpose when the cartridge 20' is inserted into any of the valve body modifications disclosed. Recess 35' in cartridge 20' is adapted to receive an O-ring (not shown), which separates the respective sides of the cartridge to thus seal the hot water side from the cold water side. Circumferential grooves 34' and 34" are adapted to receive O-rings (not shown) to seal the ends of the cartridge in the valve body. The O-ring for recess 34" must also include sealing means for the diverter channel 32', as described supra.

The poppet valve assemblies for the modified cartridge include cap members 100, 102 which are threadedly engaged into the cartridge 20', as clearly shown in FIG. 15. The members 100, 102 have flow orifices 101, 103 therein having seat portions 104, 106 which may be bonded onto the caps-forming seats for the poppet valves 108, 110 respectively. The seat portions may be of conventional rubber composition or a fluorocarbon composition and may be either bonded or molded into the cap or pressed in as a washer to form a tight fit.

Poppets 108, 110 have levers 112, 114, respectively, affixed thereto and projecting therefrom which are in operative association with cam members 25'. Cam member 25' cooperates with the levers 112, 114 to tilt the poppet valves off their respective seats when engaged by the said cam. It is noted that the reciprocation and rotation of cam member 25' actuates the poppet valves 108, 110 and permits the flow of hot and cold water into the mixing chamber of the valve in the manner similar to the operation of the cartridge described with reference to FIGS. 3—7. However, instead of being axially displaced as in the previously described embodiment, the poppets are tilted off their respective seats.

Cap-shaped retainers 124, 126 are inserted into the caps 100, 102 to assist positioning of the seats 104, 106, and also for the purpose of confining coil spring means 128, 130, respectively, between the respective poppet valve and retainer to thereby constantly urge the poppet valves into a seated or closed position. Retainers 124, 126 have orifices 124', 126' on their exposed sides to permit passage of water therethrough from their source of supply. Spring means 128, 130, which are of the coil type, are properly positioned by locating one end of each of the coil springs around shank portions 112', 114' of levers 112, 114 respectively. The other end of each of the springs is confined by means of projection means 125, 127 located on the inside of the retainers 124, 126, respectively, as clearly shown in FIG. 15.

With reference to FIG. 16, poppet valve 110 has a series of orifices 111 which are positioned on the outer periphery of the poppet valve at the radial distance beyond where the poppet is seated, indicated generally as the area between dotted lines 120, 121. It will be observed that unseating of the poppet 110 will allow water to flow past the seated area through orifices 111 and into the respective mixing chamber 6'. Guide orifices 116 are also positioned on the outer periphery of poppet 110 and are adapted to receive projection means 117 which serve to guide the poppet valve as it is being opened and closed. Such guiding permits the poppet to open and yet not be rotatively relocated as this would cause the arm 114 to be in an improper position with respect to cam member 25'. Hence, in order to prevent rotation of the poppet valve, a peripheral orifice 116 is constantly guided by the projections 117 which are part of the retainers 124.

Similarly, poppet valve 108 as shown in FIG. 15 has guide orifices 116' positioned to accept projection means 117' to thereby guide the said valve.

It will be seen that the modified cartridge, as shown in FIGS. 14 through 16 provides because of the unique leverage structure, a mechanical advantage which permits the valve poppets 108 and 110 to be opened more readily than the poppet arrangement disclosed shown in FIG. 5 wherein the displacement of the poppet is primarily in an axial or radial direction by means of projections 50, 51 being displaced by the cam member 52. Whereas, the modified poppet structure acts to create a lever arm on the poppet valve to tilt it to an open position. It is understood that the positioning of the cam 25' with respect to the poppets to levers 112, 114 is automatically positioned since the cartridge is positively located in its respective valve chamber as previously described. It is noted that the diverter channel 32 can be provided in the valve cartridge to render the same available at all times although the valve cartridge may be employed in only a limited number of installations where the channel is required.

Although the stem 17 and operating cam 25, shown in FIGS. 1, 8 and 9, are integral, and are usually produced by machining, a modified arrangement is shown in FIGS. 17—19 which also provides additional guiding features hereinafter explained. In FIG. 17, cartridge 20' has a stem 17' projecting therefrom which is affixed to the operating handle or lever (not shown). Stem 17' is joined to cam operator 25' by means of a coupling 150 which may be silver soldered or brazed to the said stem and cam operator. The coupling 150 is journaled in the top portion 151 of the cartridge within bore 152 to thereby guide the stem 17' where it projects from the cartridge. The cam operator 25 is also guided in its axial and rotative movement by means of a lower guide means 153 which includes a disc 154 positioned in the bottom of the cartridge having a guide pin 155 centrally positioned therein which is staked, or soldered, to the said disc. The guide pin projects into and is in alignment with an axial blind hole 156. It is seen that as the stem 17' is moved axially upward, as viewed in FIG. 17, the stem is guided by both the coupling 150, journaled in top portion 151 of the cartridge, and, the lower guide means 153 whereby cam operator 25 has guide pin 155 positioned therein to guide the said cam axially. As the stem is moved upwardly, the shoulder 160 on coupling 150 acts as a stop against internal top wall 161 to thereby prevent further upward movement of the stem 17' and operating cam 25'. Disc 154 is prevented from rotation by a lug portion 158 of cartridge 20' which projects into a recess 159 of the disc, as clearly shown in FIGS. 18 and 19. The disc 154 is secured to the guide pin by staking or riveting, as at 160.

The above disclosed guide means for the operating cam and stem provide a smooth operating, accurate, and highly reliable source of positioning the respective poppet valves of the cartridge. It is understood, of course, that the lower guide means, which includes the disc and guide pin, may also be incorporated in a unitary cam and stem, whereby the cam is bored with an axial hole to enable insertion of a guide pin therein.

The invention is not to be limited to or by details of construction of the particular embodiment thereof illustrated by the drawings, as various other forms of the device will, of course, be apparent to those skilled in the art without departing from the spirit of the invention or the scope of the claims.

I claim:

1. A mixing valve of the type having a single handle for controlling the flow of hot and cold water, in combination, a valve housing providing a mixing chamber, supply pipes for hot and cold water respectively, having a secured connection with the housing and having inlet openings in communicating relation with the mixing chamber and a discharge spout for the mixing chamber, a cylindrical valve cartridge having a central passage located in the mixing chamber of the valve housing and interposed between the inlet openings for the hot and cold water and the discharge spout for the mixing chamber, a pair of poppet valves carried by the valve cartridge on respective sides thereof to control flow to the central passage, whereby one poppet valve is disposed adjacent the hot water inlet opening and the other poppet valve is disposed adjacent the cold water inlet opening, a cam member for actuating the poppet valves to cause the same to open, said cam member being located within the central passage of the cylindrical valve cartridge and in operative associated relation with the poppet valves, and a valve stem having the cam member secured to one end thereof and extending through the mixing chamber exteriorly of the valve housing for receiving an actuating handle member.

2. A mixing valve of the type having a single handle for controlling the flow of hot and cold water as defined by claim 1, wherein the valve cartridge also carries resilient means for respectively biasing the poppet valves for normally maintaining the valves in closed position.

3. A mixing valve as defined by claim 2, and further including guide means for said stem and cam member.

4. A mixing valve as defined by claim 3, wherein said guide means comprises a disc positioned within the central passage of the cylindrical valve cartridge having a centrally positioned guide pin therein, said pin projecting into said cam member to guide the same upon reciprocal and rotative movement.

5. A mixing valve of the type having a single handle for controlling the flow of hot and cold water as defined by claim 1, wherein the valve cartridge also carries resilient means in the form of leaf springs each having one end anchored in the valve cartridge, said resilient means respectively biasing the hot and cold poppet valves for normally maintaining the valves in closed position, and wherein the cylindrical valve cartridge together with the poppet valves and the said resilient means is removable from the valve housing as a unit.

6. A mixing valve of the type having a single handle for controlling the flow of hot and cold water as defined by claim 1, additionally including an actuating button on each poppet valve and which project inwardly towards the cam member, whereby actuation of the cam member will cause the cam member to contact the respective buttons and open the poppet valves.

7. A mixing valve of the type having a single handle for controlling the flow of hot and cold water as defined by claim 1, additionally including an actuating button on each poppet valve and which project inwardly towards the cam member, and wherein the cam member has a generally truncated exterior shape with a flat surface on one side, said flat surface being normally disposed adjacent the button on the hot water poppet valve, whereby push-pull movement of the stem and cam member will actuate the cold water poppet valve, and whereby the hot water poppet valve is actuated to cause it to open by rotation of the stem and cam member provided the stem has been pulled to locate the cam member so as to effect an opening of the cold water poppet valve.

8. A mixing valve as defined in claim 1, wherein said valve cartridge further includes resilient means for biasing said poppet valves in a normally closed position; and, a lever affixed to each of said poppet valves adapted to be actuated by said cam member.

9. A mixing valve as defined in claim 8 and further including retainer means for confining said resilient means against said poppet valves, said retainer means having projection means thereon adapted to guide said poppet valves.

10. A mixing valve of the type having a single handle for controlling the flow of hot and cold water, in combination; a valve housing providing a mixing chamber of generally cylindrical shape and having one open end; hot and cold water supply pipes in connected relation respectively with the valve housing and having inlet openings in communicating relation with the mixing chamber; a cylindrical valve cartridge in the mixing chamber and having a central passage communicating with the mixing chamber and in interposed position between the inlet openings; a pair of poppet valves carried by the cylindrical valve cartridge and which are mounted in opposite sidewalls of the cartridge controlling flow between the inlet openings and the central passage, whereby one poppet valve is located adjacent the hot water inlet opening and the other poppet valve is disposed adjacent the cold water inlet opening; a cam member located within the central passage of the valve cartridge and having operative associated relation with the poppet valves for actuating the valves when the cam member is actuated; a valve stem fixed to the cam member and extending exteriorly of the valve housing, and housing means releasably secured to the valve housing for closing the open end of the mixing chamber, said valve cartridge together with the poppet valves carried thereby being removable from the mixing chamber through said open end.

11. A mixing valve as defined in claim 10 wherein said stem is fixed to said cam member by a coupling adapted to be journaled in the top portion of said cartridge.

12. A mixing valve as defined by claim 10, and further including guide means for said stem and cam member.

13. A mixing valve as defined by claim 12, wherein said guide means comprises a disc positioned within the central passage of the cylindrical valve cartridge having a centrally positioned guide pin therein, said pin projecting into said cam member to guide the same upon reciprocal and rotative movement.

14. A mixing valve of the type having a single handle for controlling the flow of hot and cold water as defined by claim 10, additionally including a resilient member for each of said poppet valves for yieldingly maintaining its respective valve in closed position, each said resilient member having one end of the same anchored in the valve cartridge.

15 A mixing valve of the type having a single handle for controlling the flow of hot and cold water as defined by claim 10, additionally including a resilient member for each of said poppet valves for yieldingly maintaining its respective valve in closed position against a seat provided by the valve cartridge, and a harness having interfitting relation with the valve cartridge for sealing the hot water side of the valve cartridge from the cold water side.

16. A mixing valve as defined in claim 10, wherein said valve cartridge further includes resilient means for biasing said poppet valves in a normally closed position; and, a lever affixed to each of said poppet valves adapted to be actuated by said cam member.

17. A mixing valve as defined in claim 16, and further including retainer means for confining said resilient means against said poppet valves, said retainer means having projection means thereon adapted to guide said poppet valves.

18. A mixing valve of the type having a single handle for controlling the flow of hot and cold water, in combination: a valve housing providing a mixing chamber of generally cylindrical shape and having one open end; hot and cold water supply pipes in connected relation respectively with the valve housing and having inlet openings in communicating relation with the mixing chamber; a cylindrical valve cartridge in the mixing chamber having a central passage and in interposed position between the inlet openings; a pair of cap members positioned in said cartridge one of which is in communication with the hot water inlet opening and the other of which is in communication with the cold water inlet opening; each cap member having an orifice therein; a valve seat in juxtaposition with each said orifice; a cap-shaped member positioned in each of said cap members; a poppet valve disposed adjacent each of said orifices and seats adapted to be moved relative to its respective seat; resilient means interposed between each of said cap-shaped members and said poppet valves for normally maintaining said valves in a closed position relative to its seat; a lever affixed to each of said poppet valves extending into said central passage; a cam member located within said central passage of the valve cartridge and having operative association with said levers for tilting said valves off their respective seats when said lever is actuated by said cam member; a valve stem fixed to the cam member and extending exteriorly of the valve housing, and housing means releasably secured to the valve housing for closing the open end of the mixing chamber, said valve cartridge together with said poppet valves carried thereby being removable from the mixing chamber through said open end.